Figure 5:
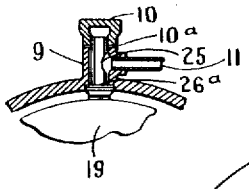

E. J. SWEETLAND.

PRESSURE FILTER.

APPLICATION FILED JAN. 28, 1914.

Reissued Nov. 7, 1916. 14,213.

2 SHEETS—SHEET 1.

Witnesses:
Karl A. Hult
Bernard F. Conaghan

Ernest J. Sweetland Inventor
By his Attorney
Gerald E. Terwilliger

E. J. SWEETLAND.

PRESSURE FILTER.

APPLICATION FILED JAN. 28, 1914.

Reissued Nov. 7, 1916.

14,213.

2 SHEETS—SHEET 2.

Witnesses:
Karl S. Deik
Bernard F. Conaghan

Ernest J. Sweetland Inventor
By his Attorney
Gerald E. Terwilliger

UNITED STATES PATENT OFFICE.

ERNEST J. SWEETLAND, OF MONTCLAIR, NEW JERSEY.

PRESSURE-FILTER.

14,213. Specification of Reissued Letters Patent. Reissued Nov. 7, 1916.

Original No. 1,032,091, dated July 9, 1912, Serial No. 684,873, filed March 19, 1912. Application for reissue filed January 28, 1914. Serial No. 815,087.

*To all whom it may concern:*

Be it known that I, ERNEST J. SWEETLAND, a citizen of the United States, residing at Montclair, New Jersey, have invented new and useful Improvements in Pressure-Filters, of which the following is a specification.

The object of this invention is to provide a filter by means of which solid matter may be filtered from liquids with a minimum amount of labor.

A further object is to provide a filter wherein the filter cloth or other filtering medium may be washed without opening or separating the several parts of the machine.

Another object is to provide a filter wherein the residual component or "cake" can be conveniently removed from the filter surfaces by sluicing with water; or the "cake" may be dislodged from the filter surfaces and discharged in its natural condition without the addition of water, as may be preferred by the operator.

Another object is to provide a filter wherein all the parts are easily accessible for repair or renewal.

Another object is to provide a filter wherein the several filtering members are individually controllable from the outside of the machine, and any one may be shut off at will in the event of a tear occurring in the filter cloth.

Another object is to provide a filter wherein a space is provided in the bottom of the filter body to facilitate flushing out the residues, but so constructed that the filter body may be inverted if desired, bringing this void space to the top, so that the surplus liquid may be forced out through the filter cloth. Another advantage gained by inverting the filter is that the interior of the filter members are then drained by gravity.

Another object is to provide a filter wherein the filtered liquid issuing from each filtering member is separately visible to the operator so that if any one of the members should become defective by clogging, or by a tear in the cloth, the imperfection will be indicated by the appearance of the liquid passing through the transparent delivery tubes.

While it is the object of this invention to perform the service now performed by the ordinary filter press of sectional construction it is radically different from these filter presses in that it dispenses entirely with the use of "frames" or "containers" and their attendant disadvantages.

It is well known that in plate and frame filter presses of the ordinary type wherein the filter cloth is clamped between the sections, there is considerable leakage, and the filter cloth is mechanically injured by being squeezed between the sections.

It is one of the objects of my invention to overcome these objections.

The construction will be understood by those skilled in the art by reference to the accompanying drawings wherein like characters refer to similar parts in all the figures.

Figure 3:
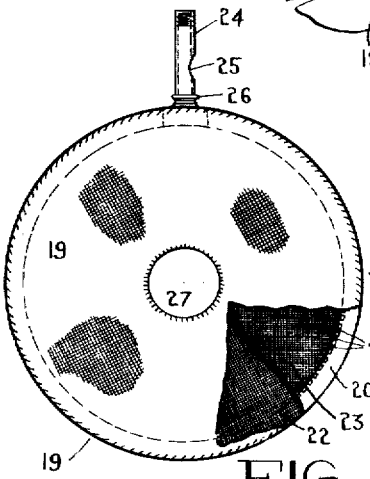
Figure 1:
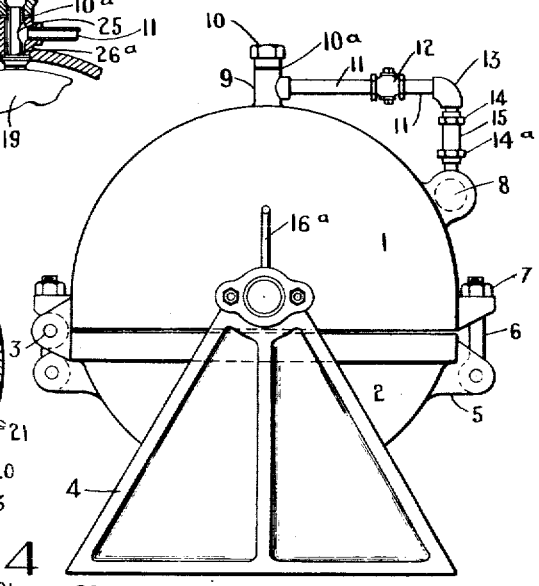
Figure 4:
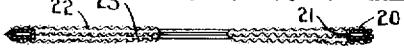
Figure 2:
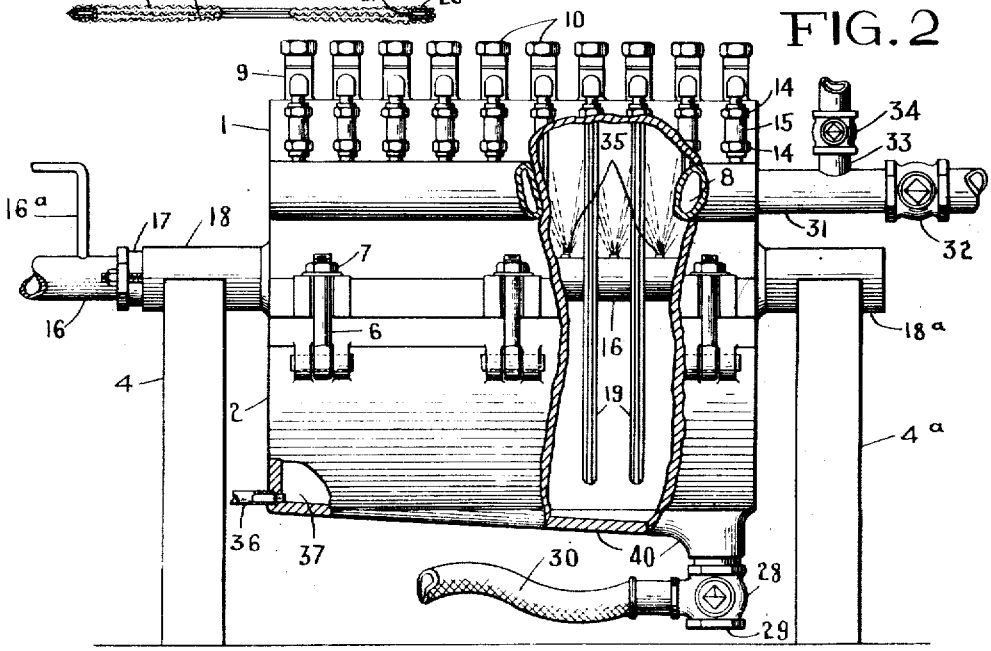
Figure 6:
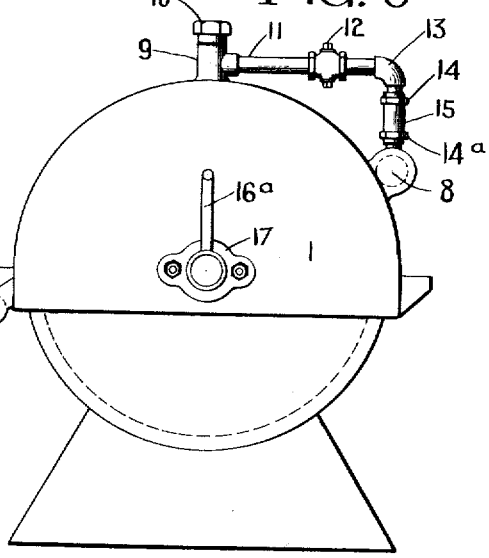
Figure 9:
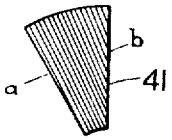
Figure 10:
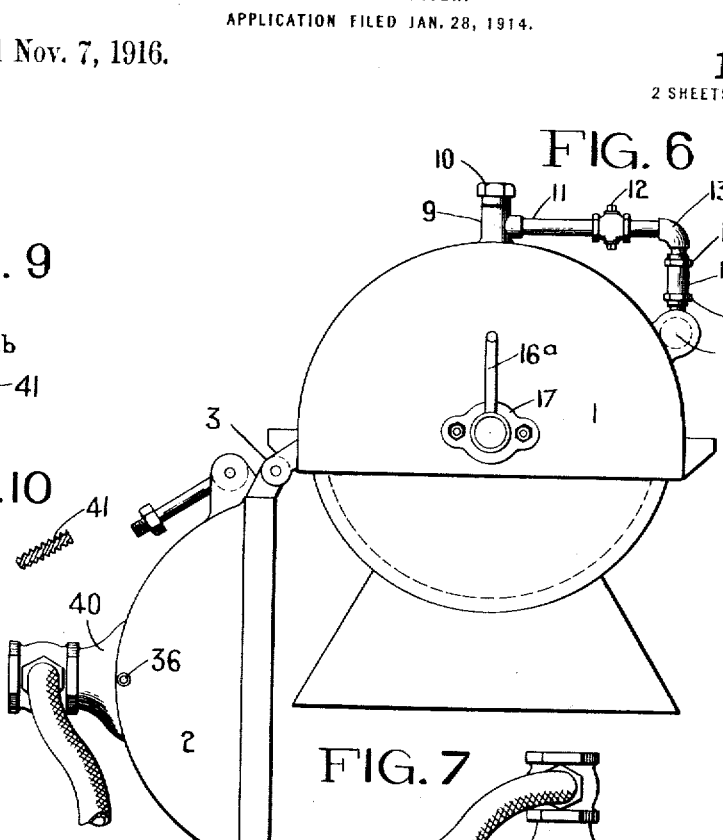
Figure 7:
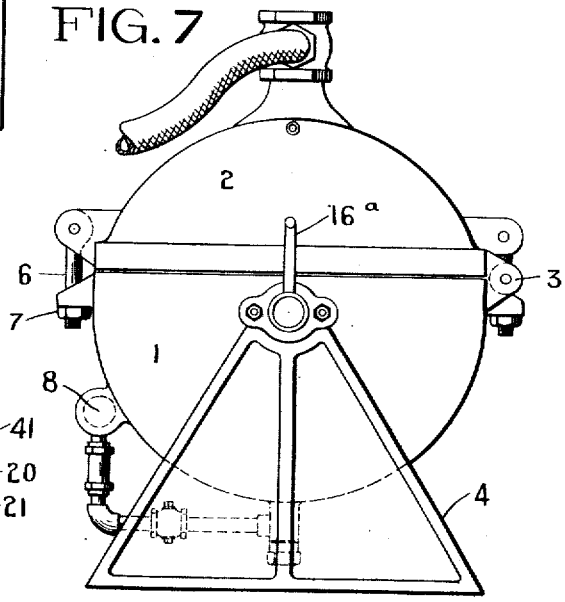
Figure 8:
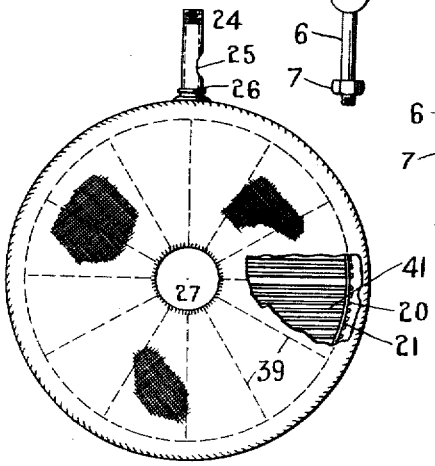

Referring to the drawings: Figure 1 is an end elevation of the assembled machine. Fig. 2 is a side elevation with a portion broken away to show the interior construction. Fig. 3 shows one of the filter members removed with a section of the filter cloth laid open to show the screen within. Fig. 4 is a horizontal sectional view of Fig. 3 on the center line looking downward. Fig. 5 is a sectional view showing the means of attaching the filter members to the filter body. Fig. 6 shows an end elevation of the assembled machine opened for dry discharging of residues, or for repairs to the interior, the standard 4 being omitted to better show the parts. Fig. 7 shows the filter body inverted by having been turned through an arc of 180 degrees on its axis. Fig. 8 shows a modified form of filter device wherein the filter cloth is stitched in radial seams and held apart by corrugated plates. Fig. 9 shows a corrugated plate for a filter device of the type shown in Fig. 8. Fig. 10 is a section of Fig. 9 on the line *a—b*.

Referring to the parts: 1 is the upper portion of the filter body to which the lower portion 2 is attached by means of the hinge 3, the whole being supported on the standards 4 and $4^a$ by means of the trunnions 18 and $18^a$ which are attached to the upper portion 1. The lugs 5 are provided with eyebolts 6 and nuts 7 which hold the upper and lower portions in close union with each other forming a water tight chamber with a gasket between the two portions. A conduit or passageway 8 runs along the side of 1. A plurality of hollow projections 9 are located along the top of the filter body and a pipe 11, elbow 13 and glass tube 15 form a passageway for the filtered liquid from the filter members to the conduit.

12 is a valve and 14 and 14ª are suitable fittings to connect the glass tube to the pipe fittings.

A sluicing pipe 16 passes through a stuffing box 17 and runs through the entire length of the filter body on the longitudinal axis thereof. This pipe is provided with a plurality of holes or nozzles 35 through which a fluid may be projected against the filter devices 19 for the purpose of cleaning.

18 and 18ª are trunnions upon which the whole filter body rests in bearings at the top of 4 and 4ª. These trunnions are hollow, and the sluicing pipe passes through 18 and its end terminates in 18ª which is closed at the outer end. The inner end of the sluicing pipe is closed so that any fluid forced through it must pass through the openings 35.

When it is desired to remove any of the filter devices, the lower section 2 of the casing is swung open on its hinges as shown in Fig. 7, and the sluicing pipe removed, when any filter device may be taken out by unscrewing the cap 10.

The filter device 19 comprises a circular frame made of pipe 20 with holes 21 on its inner periphery. A screen or grating 23 forms a web on the interior of the frame. A hole 27 is formed in this web. A nipple 24 connects with the perforated pipe and this nipple has a side outlet 25 which alines with pipe 11 in the assembled machine. The shoulder 26 and gasket 26ª form a sealed joint between the filter device and the outer casing, and the gasket 10ª between the cap 10 and the projection 9 prevents leakage to the outside. The entire filter device is covered with cloth, canvas or other fabric on both sides, and the edges of the cloth 22 are sewed together all around the periphery and likewise around the edges of the central hole 27, so that any liquid which issues from the outlet 25 must first have passed through the cloth.

In the modified filter device shown in Fig. 8, the parts are similar to those of Fig. 3 except that corrugated plates 41 are used instead of screen or grating, and the two layers of cloth are stitched together in radial lines 39 to hold the plates 41 in place and prevent undue bulging of the bags when pressure is applied to the interior. One of the plates is shown in elevation in Fig. 9, and in section in Fig. 10.

The three-way valve 28 serves as inlet for the filter body through the flexible hose 30 and as outlet through the larger passageway 29.

31 is a pipe connected with conduit 8.

33 is a side connection, and 32 and 34 are 36 is a pipe connection and 37 is a nozzle directed along the bottom of the filter casing.

40 is a sloping drainage channel terminating at the outlet passage.

As the entire filter body and its attendant parts is invertible, the parts which are "upper" in the normal position become "lower" in the reversed position, therefore to avoid confusion be it understood that wherever the terms "upper," "lower," etc., are used throughout this specification and in the claims, reference is made to the location of the parts when the filter body is in its normal position as shown in Fig. 1.

*Operation.*

The liquid to be filtered is forced into the filter body through the hose 30 and valve 28 until the entire filter body is filled and the filter devices submerged. During the filling the air may escape through any convenient opening at the top of the filter body or through the filter cloth. As soon as the filter body is filled filtration commences, the liquid passing through the filter cloth flows through the spaces on the inside of the filter device through the perforations 21 into pipe 20 whence it flows through the passage 25 into pipe 11, through the various fittings into the conduit 8, from which it issues through pipe 31 and valve 32 into any desired receptacle. As filtration continues the solid or semi-solid matter which will not pass through the filter cloth is deposited upon the walls of said cloth, forming a "cake" of residue which gradually increases in thickness as filtration progresses. This cake in practice usually contains soluble matter of value which has to be removed by washing or displacement. To accomplish this object suction is applied to pipe 31 which prevents the "cake" falling off when relieved of external pressure. The surplus unfiltered liquid surrounding the "cakes" is then withdrawn through 29 and water forced into the filter body under pressure, which percolates through the residues adhering to the cloths and washes out any soluble matter they might contain. This done, the surplus water may be withdrawn through 29 and the filter may be cleaned.

*Cleaning or discharging.*

*Wet method.*—If it is desired to sluice the residual cake from the filter body, this may be done by opening valve 28 toward outlet 29 and forcing a liquid under pressure through the sluicing pipe 16 and slowly revolving same by means of the crank 16ª. The liquid issues in forcible jets through the openings or nozzles 35 and flushes the residues off the filter devices; the mixed residues and sluicing liquid flows out through 29. While this is in progress a stream is also projected from nozzle 37 which assists in flushing the accumulated solids out of the filter body. If desired, while sluicing is in progress, valve 32 may be closed and steam or compressed air turned in through valve 34 which enters the interior of the filter devices and bulges the filter cloth, changing the point of impingement of the streams from the sluicing pipe, and at the same time opening the pores of the filter cloth. If desired, water may be forced through the filter cloth from the interior of the filter devices, or air and water may be alternately forced through, which is of great assistance in cleaning the cloth.

In some cases I may clean the filter surfaces by partially filling the filter chamber with water, or with any suitable solvent and rotate the filter on its axis, whereby the cleansing action of the water or solvent will be enhanced by its motion over the filter surfaces.

*Dry discharging.*—If it is desired to recover the "cakes" without disintegrating them the sluicing pipe may be left out entirely and inserted only at such times as it is desired to wash the cloths. To discharge the "cakes" without sluicing it is necessary only to open the filter body as shown in Fig. 6, holding the "cakes" in place with vacuum until ready, and then admit compressed air through the pipe 31 which disengages the "cakes" from the filter devices and causes them to fall into any desired receptacle below. For this method of operating the type of filter device shown in Fig. 8 is preferable as the stitching prevents undue bulging of the cloth when compressed air enters the interior.

*Filtering with filter inverted.*

The object of inverting the filter body is to give perfect drainage by gravity of the filtrate from the filter devices so that a minimum of strong liquor will remain to mix with the wash liquid. Another object of inversion is based on the fact that in the normal position of the filter the channel or space in the bottom for drainage always contains unfiltered liquid that has to be withdrawn, while if the filter body is inverted this space is at the top and all the liquid may be forced out through the cloths by compressed air, leaving no surplus to be withdrawn, and leaving the "cakes" practically dry.

I do not limit my invention to the specific construction described, nor do I limit myself to cloth as a filter medium, for the same principle may be employed with any form of filter plate.

What I claim as my invention is:

1. In a filter device comprising a peripheral frame with an outlet passage, filter cloth surrounding the frame and secured at the edges, a separator within the frame covered by the cloth, said filter device provided with a central aperture forming an open passageway therethrough, and the cloth secured together around the aperture, radial rows of stitching uniting the filter cloth at intervals.

2. A filter comprising a cylindrical filter casing with a plurality of filter plates detachably secured within the casing, each plate having a delivery tube extending through the casing and secured thereto by means of a device on the outside of the casing, a conduit on the outside of the casing for the drainage of filtered liquid, a tube leading from each filter plate to the conduit, a valve on each of said tubes, a hinged door on the lower side of the casing, an auxiliary passageway through the door.

3. A filter comprising a cylindrical filter casing with a plurality of filter plates detachably secured within the casing, each plate having a delivery tube extending through the casing and secured thereto by means of a device on the outside of the casing, a conduit on the outside of the casing for the drainage of filtered liquid, a tube leading from each filter plate to the conduit, a valve on each of said tubes, a portion of each tube made of transparent material.

4. A filter comprising a cylindrical filter casing, a plurality of filter plates attached within and removable from said casing, a hinged door attached to the filter casing and extending the full length thereof, said door provided with an auxiliary aperture for the entrance or exit of liquid, the filter plates extending below the joint between the filter casing and the door, a conduit on the filter casing and a tube and valve connecting each filter plate with the conduit.

5. A filter comprising a plurality of filter bags, a supporting structure within each bag, each bag provided with an aperture, the cloth on opposite sides of each bag joined together around the aperture and joined together at the outer edges to completely inclose the supporting structure, the cloth on both sides of the bags supported at intervals to resist internal pressure, the said apertures registering to form an unobstructed passageway through the series of bags, a rotatable pipe passing through the apertures, outlets in said pipe adapted to project streams of a cleansing fluid on the surfaces of the bags.

6. A filter comprising a plurality of filter bags, a supporting structure within each bag, each bag provided with a central aperture, the cloth on the opposite sides of each bag joined together around the aperture, the outer edges of each bag sewn together to completely inclose the supporting structure within the bag, the cloth on both sides of the bag supported at intervals to resist internal pressure, an outlet pipe leading from the interior of each bag, the central apertures alining to form a continuous passageway through the series of bags, a rotatable pipe extending through said passageway, nozzles on the pipe adapted to project a cleansing fluid on the surfaces of the bags.

7. A filter comprising a plurality of flat circular filter bags, a supporting structure inclosed in each bag, each bag provided with a central aperture, the cloth on opposite sides of each bag joined together around the central aperture, peripheral stitching uniting the outer edges of each bag to completely inclose the supporting structure within the bag, means of supporting the sides of the bag to prevent bulging when subjected to internal pressure, an outlet pipe communicating with the interior of each bag, the central apertures alining to form a continuous passageway through the series of bags, a rotatable pipe extending through said passageway and adapted to project a cleansing fluid on the surfaces of the bags.

8. A filter comprising a plurality of flat circular filter bags, a supporting structure inclosed in each bag, each bag provided with a central aperture, the cloth on opposite sides of each bag joined together around the central aperture, peripheral stitching uniting the outer edges of each bag to completely inclose the supporting structure within the bag, means of supporting the sides of the bag to prevent bulging when subjected to internal pressure, an outlet pipe communicating with the interior of each bag, the central apertures alining to form a continuous passageway through the series of bags, a rotatable pipe extending through said passageway and adapted to project a cleansing fluid on the surfaces of the bags, a casing surrounding the entire series of bags with the outlet pipes passing through said casing.

9. A filter comprising a plurality of flat circular filter bags, a supporting structure inclosed in each bag, each bag provided with a central aperture, the cloth on opposite sides of each bag joined together around the central aperture, peripheral stitching uniting the outer edges of each bag to completely inclose the supporting structure within the bag, means of supporting the sides of the bag to prevent bulging when subjected to internal pressure, an outlet pipe communicating with the interior of each bag, the central apertures alining to form a continuous passageway through the series of bags, a rotatable pipe extending through said passageway and adapted to project a cleansing fluid on the surfaces of the bags, a casing surrounding the entire series of bags with the outlet pipes passing through said casing, a drainage channel in the bottom of the casing for drainage of material washed from the bags.

10. In a pressure filter, a filter element and a two-part casing therefor divided longitudinally substantially at its middle along a horizontal plane, hinge connection between said sections, the axis of said hinge being situated to one side of the casing to permit one section to swing about the hinge from under the entire width of the other section, and bolts disposed at each side of said casing adapted to span the line of division and to clamp the sections together independently of said hinge.

11. A filter comprising a filter casing with a plurality of filter plates detachably secured within the casing, each plate having a delivery tube extending through the casing and secured thereto by means of a device on the outside of the casing, a conduit on the outside of the casing for the drainage of filtered liquid and a tube leading from each delivery tube to the conduit.

12. A filter comprising a filter casing with a plurality of filter plates detachably secured within the casing, each plate having a delivery tube extending through the casing and secured thereto by means of a device on the outside of the casing, a conduit on the outside of the casing for the drainage of filtered liquid, a tube leading from each delivery tube to the conduit, a valve on each of said second named tubes, a portion of each of said second-named tubes being made of transparent material.

13. In a filter device comprising a peripheral frame with an outlet passage, filter cloth surrounding the frame, a separator within the frame covered by the cloth, and radial rows of stitching uniting the filter cloth at intervals.

14. A filter comprising a horizontally-disposed cylindrical filter casing divided along a substantially horizontal plane and a plurality of detachable filter plates within the casing, each plate having a delivery tube extending vertically from substantially its uppermost portion and mounted in the top of the upper section of the filter casing.

15. A filter comprising a filter casing and a plurality of filter plates detachably mounted therein, each plate having a delivery tube secured thereto and received within a portion of the casing, and means for clamping it to said casing.

16. A filter comprising a filter casing and a plurality of filter plates detachably mounted therein, each plate having a delivery tube secured thereto and received within a portion of the casing, and means for clamping it to said casing, said leaf being otherwise disconnected from the casing.

17. A filter comprising a filter casing and a plurality of filter plates detachably mounted therein, each of said plates having a delivery tube fixed with reference to said plate and received within a recess in the casing and means engaging said tube for securing the tube and the leaf supported by it to the casing.

18. A filter comprising a filter casing and a plurality of filter plates detachably secured in said casing, each plate having a delivery tube extending through said casing and secured thereto by means of a device on the outside of the casing.

19. A filter comprising a filter casing and a plurality of filter plates detachably secured in said casing, each plate having a delivery tube extending through the casing and secured thereto by means of a device on the outside of the casing, said leaf being otherwise spaced from the casing.

20. A filter comprising a filter casing and a plurality of filter plates detachably secured in said casing, each plate having a delivery tube extending through the casing and secured thereto by means of a device on the outside of the casing, said leaf being otherwise unsupported in said casing.

E. J. SWEETLAND.

Witnesses:

GERALD E. TERWILLIGER,
KARL S. DEITZ.

Correction in Reissue Letters Patent No. 14,213.

It is hereby certified that Reissue Letters Patent No. 14,213, granted November 7, 1916, upon the application of Ernest J. Sweetland, of Montclair, New Jersey, for an improvement in "Pressure-Filters," were erroneously issued to the inventor, said Sweetland, whereas said Letters Patent should have been issued to *The Sweetland Filter Press Company, Inc., a corporation of New York*, as assignee of the entire interest in said invention, as shown by the records of assignments in this office; and that the said Letters Patent should be read with this correction therein that the same may conform to the record of the case in the Patent Office.

Signed and sealed this 26th day of December, A. D., 1916.

[SEAL.] R. F. WHITEHEAD,

*Acting Commissioner of Patents.*

Cl. 200—13.